(12) United States Patent
Paek et al.

(10) Patent No.: US 9,009,748 B2
(45) Date of Patent: Apr. 14, 2015

(54) SLAVE DISPLAY DEVICE, SET-TOP BOX, AND DIGITAL CONTENTS CONTROL SYSTEM

(75) Inventors: Hoon Paek, Seongnam-si (KR); Won Hee Lee, Yongin-si (KR)

(73) Assignees: Hoon Paek, Seongnam-si (KR); Won Hee Lee, Gyeonggi-do (KR)

( * ) Notice: Subject to any disclaimer, the term of this patent is extended or adjusted under 35 U.S.C. 154(b) by 269 days.

(21) Appl. No.: 13/005,717

(22) Filed: Jan. 13, 2011

(65) Prior Publication Data

US 2012/0167126 A1    Jun. 28, 2012

(30) Foreign Application Priority Data

Dec. 24, 2010    (KR) .......................... 10-2010-0134325

(51) Int. Cl.

| | | |
|---|---|---|
| H04N 21/422 | (2011.01) | |
| H04N 21/4363 | (2011.01) | |
| H04N 21/4402 | (2011.01) | |
| H04N 21/462 | (2011.01) | |
| H04N 21/478 | (2011.01) | |
| H04N 21/4782 | (2011.01) | |
| H04N 21/482 | (2011.01) | |
| H04N 21/643 | (2011.01) | |
| H04N 21/81 | (2011.01) | |
| H04N 21/431 | (2011.01) | |
| H04N 21/61 | (2011.01) | |

(52) U.S. Cl.
CPC ... *H04N 21/42207* (2013.01); *H04N 21/42209* (2013.01); *H04N 21/4222* (2013.01); *H04N 21/4312* (2013.01); *H04N 21/4363* (2013.01); *H04N 21/44029* (2013.01); *H04N 21/4622* (2013.01); *H04N 21/478* (2013.01); *H04N 21/4782* (2013.01); *H04N 21/482* (2013.01); *H04N 21/6118* (2013.01); *H04N 21/64322* (2013.01); *H04N 21/8126* (2013.01)

(58) Field of Classification Search
USPC ........................................ 725/80, 81, 82, 133
See application file for complete search history.

(56) References Cited

U.S. PATENT DOCUMENTS

| | | | | |
|---|---|---|---|---|
| 6,097,441 | A * | 8/2000 | Allport | 348/552 |
| 7,849,486 | B2 * | 12/2010 | Russ et al. | 725/74 |
| 2005/0262535 | A1 * | 11/2005 | Uchida et al. | 725/80 |
| 2006/0059528 | A1 * | 3/2006 | Katayama et al. | 725/114 |
| 2008/0098450 | A1 * | 4/2008 | Wu et al. | 725/132 |
| 2009/0199098 | A1 * | 8/2009 | Kweon et al. | 715/716 |
| 2010/0162303 | A1 * | 6/2010 | Cassanova | 725/37 |

(Continued)

*Primary Examiner* — Nathan Flynn
*Assistant Examiner* — Omar S Parra
(74) *Attorney, Agent, or Firm* — East West Law Group; Heedong Chae

(57) ABSTRACT

A digital contents control system includes: a set-top box which generates a video for a master display device and a video for a slave display device with a received broadcasting signal and sends the generated videos to the master display device and the slave display device, respectively; the master display device for receiving the video generated for the master display device from the set-top box and displaying the received video; and the slave display device for receiving the video generated for the slave display device from the set-top box, displaying the received video and providing a control video area for control of the master display device or the slave display device to a separate display area, wherein, when a control instruction is input through the control video area provided in the slave display device, the input control instruction is sent to the set-top box and the set-top box controls the video for the master display device or the slave display device according to the input control instruction.

4 Claims, 5 Drawing Sheets

(56) References Cited

U.S. PATENT DOCUMENTS

| | | | |
|---|---|---|---|
| 2010/0319043 A1* | 12/2010 | Jain et al. ...................... 725/110 |
| 2011/0107362 A1* | 5/2011 | Reilly et al. .................... 725/23 |
| 2011/0221962 A1* | 9/2011 | Khosravy et al. ............. 348/563 |

* cited by examiner

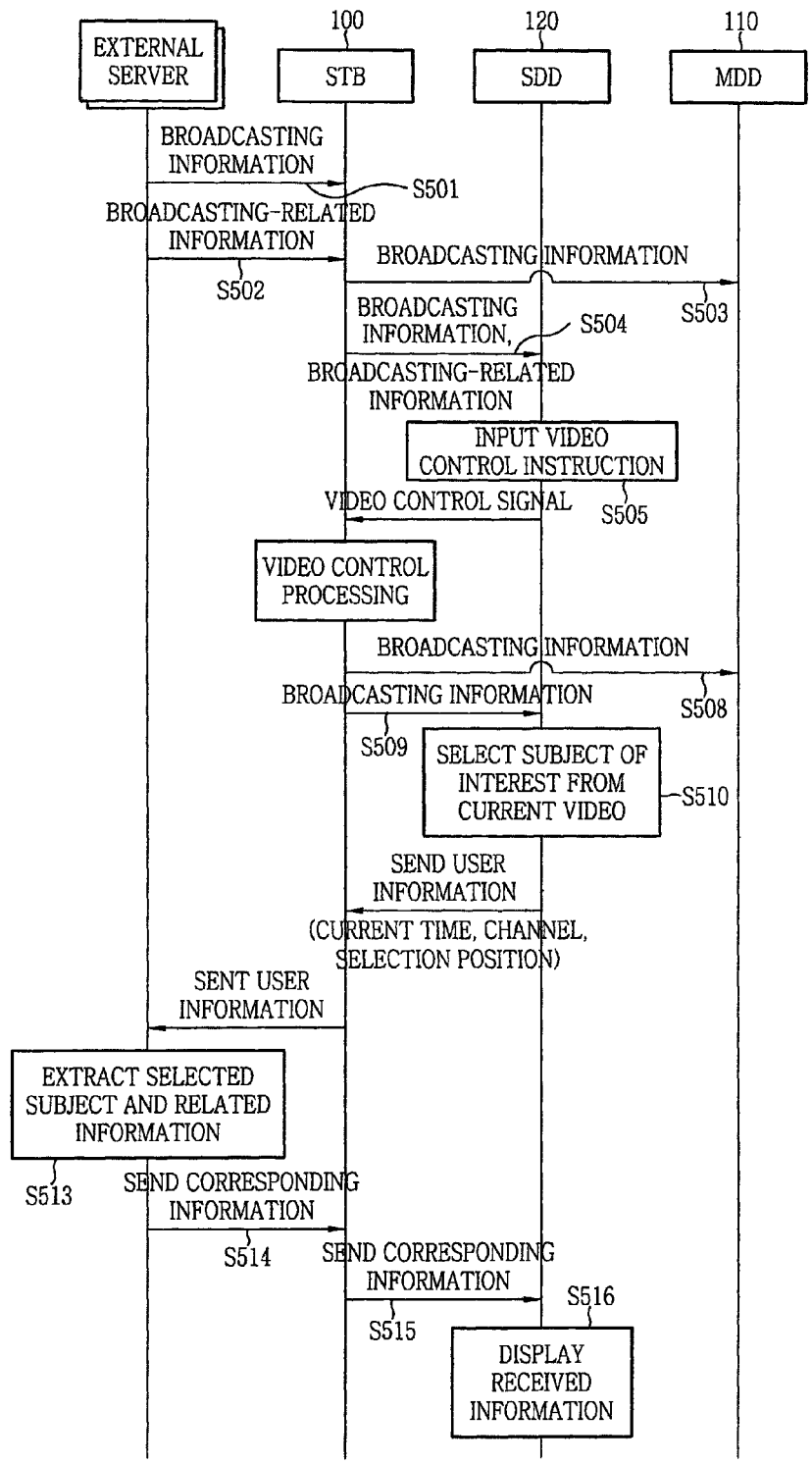

SLAVE DISPLAY DEVICE, SET-TOP BOX, AND DIGITAL CONTENTS CONTROL SYSTEM

CROSS-REFERENCE TO RELATED APPLICATION

This application claims the benefit of Korean Application No. 10-2010-0134325, filed on Dec. 24, 2010, with the Korean Intellectual Property Office, the disclosure of which is incorporated herein by reference.

BACKGROUND OF THE INVENTION

1. Field of the Invention

The present invention relates to a digital contents control system, and more particularly, to a slave display device, a set-top box, and a digital contents control system which is capable of controlling an image output from the set-top box to a master display device by means of the slave display device and providing various bidirectional contents including TV electronic commerce (T-commerce), e-Learning, banking, game, advertising, health, etc.

2. Description of the Related Art

In recent years, different sizes and kinds of display devices have been released according to consumers' ever-changing needs. In addition, with popularization of smart phones, various kinds of hand-held personal devices having different sizes of displaying means are coming onto the market, including, for example, smart phones, pad type terminals, 7-inch tablet PCs, 10-inch tablet PCs, etc. Most of such devices have a video processing function to process a mass of graphics and videos and act as master devices.

Meanwhile, TVs have started to provide various kinds of optional services using interaction with users and Internet in addition to a simple function of display of received terrestrial and cable broadcasting signals. For example, smart TVs to support interlock with smart phones are recently coming onto the market, including IPTVs interlocked with PCs or servers via Internet connection. Examples of smart TVs may include Apple TVs, Google TVs, etc., which provide various additional optional functions using interaction with users and Internet in addition traditional TV functions.

For reception of digital broadcasting, a device called a set-top box (STB) has to be added to a TV. A set-top box means "a box set on a TV" and refers to a device which is connected to a TV for converting external signals into signals of a format appropriate for the TV. In general, the set-top box is a home communication device required to use the next generation bidirectional multimedia communication service (so-called interactive TV) such as VOD (Video On Demand), home shopping, network game, etc. The set-top box may be also referred to as "subscriber signal converter." The set-top box may be also connected to interactive TVs and telephones, networks for video transmission services of companies (for example, video dial tones provided U.S. regional telephone companies) as well as home TVs.

The set-top box has a basic function of reception and conversion of video signals in addition to communication with video servers of telephone companies or integrated cable TV system (CATV). In addition, various standards for are being under review, including a telephone interface to facilitate simultaneous use of telephone communication service and data communication service such as PC communication, an interface for access to personal computers (PCs), etc. Accordingly, communication, computer and home appliance makers are competing for production and sales of set-top boxes to dominate the interactive TV market in advance.

The set-top box may not necessarily contain a tuner and examples of external signal sources may include Ethernet cables, satellite or terrestrial receiving antennas, coaxial cables, telephone lines, analog VHF (Very High Frequency) or UHF (Ultra High Frequency) antennas, etc. Examples of contents which can be received in the set-top box from such external signal sources may include videos, voices, Internet home pages, games, etc.

In this manner, through the set-top box interlocking with a network such as Internet, TVs can service other various in addition to broadcasting information and can interact with users for selection and control of services. In order to facilitate selection signal input from a user, there is a need to expand a function of a remote controller in various manner and a need to provide a convenient interface.

In addition, in recent years, as interest in smart phones and smart television is increasing, how to effectively construct an eco-system from contents to a powerful platform (for example, iTunes)-based terminal is a success factor in the market.

However, since conventional smart phone-related markets have a contents producer and owner-directed profit structure, there is a problem of limitation in profit for service providers. In addition, users may not easily combine and interlock various devices.

Accordingly, there is a need to develop a model to provide profits for both of contents owners and service providers and a need to develop a method to effectively provide users with analysis on consumers and various application services based on such analysis.

SUMMARY OF THE INVENTION

Accordingly, it is an object of the present invention to provide a slave display device, a set-top box, and a digital contents control system which is capable of controlling a TV by means of the slave display device through a video signal provided from the set-top box.

It is another object of the present invention to provide a slave display device, a set-top box, and a digital contents control system which is capable of receiving a video through the set-top box and providing a video interlocking with a TV or a separate video independent of the TV through the slave display device.

It is still another object of the present invention to provide a slave display device, a set-top box, and a digital contents control system which is capable of providing TV electronic commerce related to a video being currently broadcast through a TV by means of the slave display device by interlocking with Internet through the set-top box.

To achieve the above objects, according to an aspect of the invention, there is provided a digital contents control system including: a set-top box which generates a video for a master display device and a video for a slave display device with a received broadcasting signal and sends the generated videos to the master display device and the slave display device, respectively; the master display device for receiving the video generated for the master display device from the set-top box and displaying the received video; and the slave display device for receiving the video generated for the slave display device from the set-top box, displaying the received video and providing a control video area for control of the master display device or the slave display device to a separate display area, wherein, when a control instruction is input through the control video area provided in the slave display device, the input control instruction is sent to the set-top box and the set-top box controls the video for the master display device or the slave display device according to the input control instruction.

To achieve the above objects, according to another aspect of the invention, there is provided a set-top box including: broadcasting receiver which receives various broadcasting signals; an Internet access processor which processes information received through Internet; an application service processor which receives and processes information related to a broadcasting being currently received from the broadcasting receiver; a control video generator which generates various control video areas for a broadcasting video; an MDD video combiner which generates a video to be provided to a master display device based on information received from at least one of the broadcasting receiver, the Internet access processor, the application service processor and the control video generator; an SDD video combiner which generates a video to be provided to a slave display device based on information received from at least one of the broadcasting receiver, the Internet access processor, the application service processor and the control video generator; an SDD sensor handling processor which receives and processes control information received from the slave display device; and a main controller which controls a video to be provided to the master display device or the slave display device based on the control information received from the SDD sensor handling processor.

To achieve the above objects, according to still another aspect of the invention, there is provided a slave display device including: a TV video area which displays various broadcasting signals in video data received from a set-top box; an Internet browser video area which displays information received through Internet in the video data received from the set-top box; and a control video area which displays various control videos for a broadcasting video in the video data received from set-top box, wherein a video of a master display device or the slave display device connected to the set-top box by selecting a control means displayed on the control video area.

The present invention has an advantage in that a user can conveniently control a TV using a GUI provided through a slave display device, rather than a typical remote controller.

In addition, the present invention has another advantage in that a video interlocking with a TV or a separate video independent of the TV can be provided by receiving a video signal in a slave display device through a set-top box.

In addition, the present invention has another advantage in that information related to contents and real-time videos being currently broadcast through a TV can be acquired in a slave display device by interlocking with Internet through a set-top box, thereby providing various application services (for example, TV electronic commerce (T-commerce), e-learning, banking, game, advertising, health, etc) to users.

Moreover, the present invention has further advantage in that information related to information on a channel being currently viewed by a user can be automatically collected in the set-top box through Internet, and advertising, regional information and emergency information desired to be provided by an ISO or a CP can be displayed through an application service video area of a slave display device.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIG. 5 is a view showing a digital broadcasting control procedure through a slave display terminal according to an embodiment of the present invention.

DETAILED DESCRIPTION OF THE PREFERRED EMBODIMENT

Figure 1:
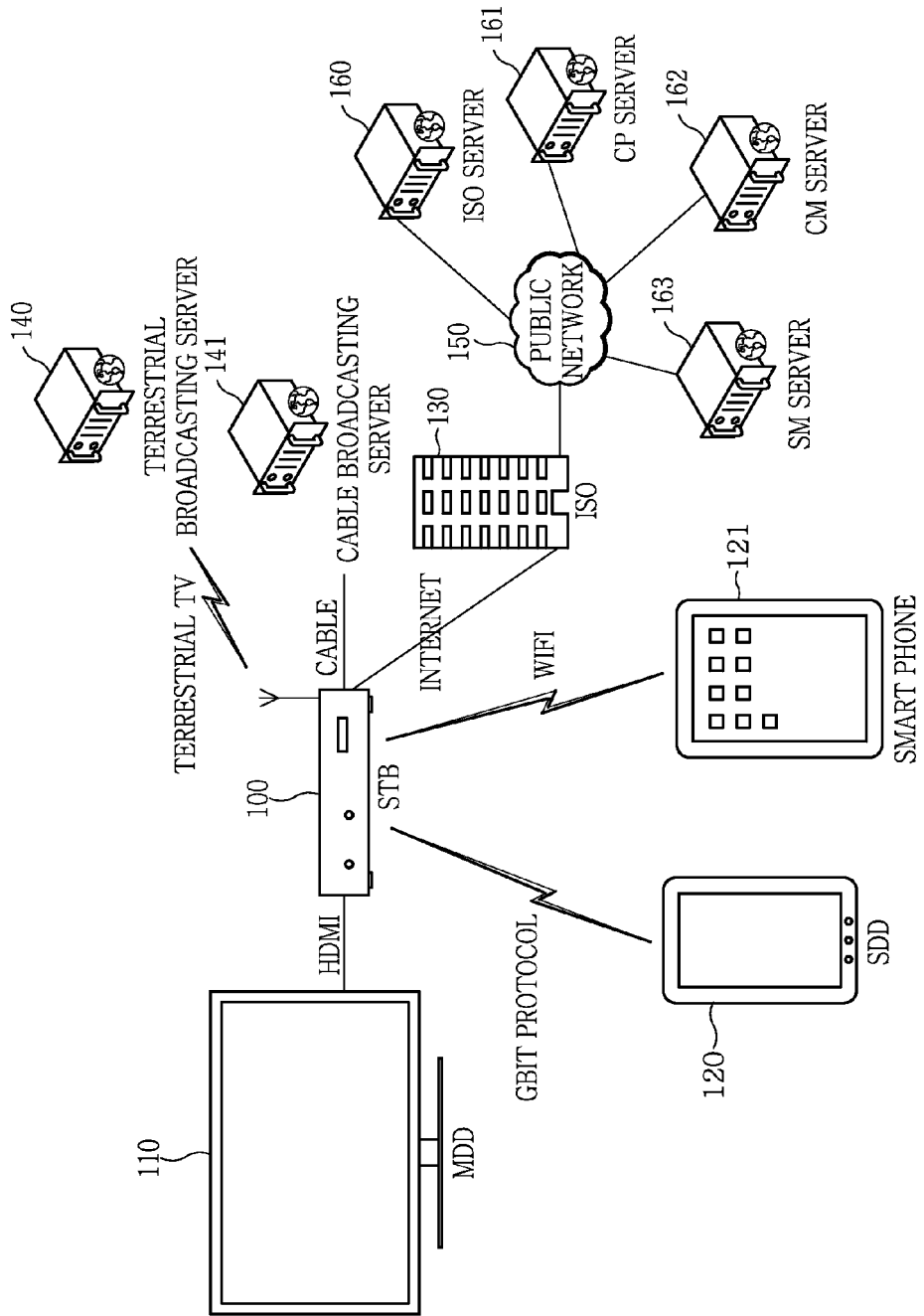
FIG. 1 is a view showing a digital contents control system according to an embodiment of the present invention.

The present invention is directed to a digital contents control system which is capable of providing and controlling various kinds of contents including broadcasting contents and providing various kinds of application services therethrough. In the following description, a system configuration provided on the basis of a set-top box to provide digital broadcasting contents and various kinds of services provided therethrough will be described by way of example. Therefore, the present invention is not limited to information related to digital broadcasting contents but may be applicable to any contents provided to a display through various kinds of network means. That is, in the following description, a 'set-top box' named for provision of digital broadcasting contents may be replaced with any devices which can provide various contents according to the present invention or a dedicated device which can implement the present invention.

In addition, when various contents are provided through a master display device according to the present invention, the various contents are provided through a slave display device at the same time and the slave display device can control various kinds of application services including provision and control of the contents and receive corresponding contents.

At this time, for the purpose of cost reduction and function simplification of the slave display device, it is preferable that a controller such as the set-top box performs most of video processing and the slave display device performs the minimal functions including a function of receiving and outputting a corresponding video and a function of sending a control signal.

In addition, the present invention suggests a separate slave display device (SDD) which is capable of controlling various functions of the set-top box through a graphic user interface (GUI) rather than a conventional remote controller. In particular, a video being currently broadcast through a TV connected to the set-top box can be also provided to the slave display device, thereby allowing more convenient control of TV or set-top box. Also, apart from a TV receiver (i.e., a master display device (MUD)), a separate display means may be provided to receive a picture interlocking with or separated from a TV from the set-top box.

In addition, according to some embodiments of the present invention, the slave display device may provide an electronic commerce ('T-commerce') related a picture being currently broadcast through a TV by interlocking with Internet through the set-top box. Moreover, the slave display device may be used to provide various kinds of bidirectional contents including TV electronic commerce (T-commerce), e-Learning, banking, game, advertising, health, etc.

To this end, the slave display device provides different pictures for different functions, including a TV picture area, a TV control picture area, an Internet browser picture area and an application service picture area, through which various functions according to embodiments of the present invention can be provided.

In addition, the set-top box of the present invention processes video signals provided to the master display device (for example, a TV receiver) and the slave display device, receives a control signal from the slave display device, and, based on the received control signal, controls a video signal to be output to the master display device.

Hereinafter, preferred embodiments of the present invention will be described in detail with reference to the accompanying drawings. In the following detailed description of the present invention, concrete description on related functions or constructions will be omitted if it is deemed that the functions and/or constructions may unnecessarily obscure the gist of the present invention.

FIG. 1 is a view showing a digital contents control system according to an embodiment of the present invention. Referring to FIG. 1, according to one embodiment of the present invention, a digital contents control system basically includes a set-top box ('STB') 100, a master display device ('MDD') 110 and a slave display device ('SDD') 120.

The MDD 110 refers to a typical display device (for example, a TV receiver) which displays broadcasting videos provided from the STB 100. Thus, HD class videos can be received and displayed through the STB 100 and a HDMI interface.

The STB 100 performs various signal processings through communication with the SDD 120 according to embodiments of the present invention in addition to a digital broadcasting receiving function provided by a conventional set-top box. That is, the STB 100 receives terrestrial TV signals from a terrestrial broadcasting server (i.e., a terrestrial broadcasting station) 140 or cable broadcasting signals from a cable broadcasting server (i.e., a cable broadcasting station) 141 and displays the received broadcasting signals through the MDD 110.

In addition, according to some embodiments, by sending a video displayed on the MDD 110 to the SDD 120, picture provision and control through a separate device may be feasible. At this time, if a Gigabit transmission protocol is applied between the STB 100 and the SDD 120, a high definition video signal can be sent, as raw data, from the STB 100 to the MDD 110 without being compressed. In this manner, with the application of the Gigabit transmission protocol, a processing delay can be minimized and optimal environments can be provided to users. On the other hand, with no application of the Gigabit transmission protocol, the high definition video signals can be compressed and sent through a communication network such as WiFi or the like.

Also as shown in the figure, the system can be implemented by the slave display device of the present invention and a dedicated device which performs various application service functions or may be implemented such that the function of the SOD 120 of the present invention is provided by a typical smart phone 121. In this case, video data can be received from the STB 100 using a local area network (LAN) such as WiFi or the like which is basically provided by the smart phone 121.

In addition, the SOD 120 can send a control signal to the STB 100 using various wireless communication means (for example, WiFi, Bluetooth or the like), and the function of the STB 100 and video signals output to the MDD 110 can be controlled based on the sent control signal.

In addition, the STB 100 includes an Internet communication means and can provide application services such as T-commerce by communicating with various servers (for example, an ISO server 160, a CP server 161, a CM server 162, a SM server 163, etc.) via an ISO 130.

The ISO (Internet Service Provider) 130 provides a service for Internet communication with each server and provides a TV electronic commerce service through the ISO server 160.

That is, when a user views broadcasting in the MDD 110 through the STB 100 supporting the SDD 120 according to the present invention, the SDD 120 provides same picture as the MDD 110. At this time, if the user is interested in a particular object (for example, a place, a dress, an article, etc) being currently displayed in the picture while viewing the broadcasting, the user can receive an application service for the particular object by clicking on the particular object on the picture of the SDD 120 or selecting link information of the particular object provided in a separate picture.

More specifically, information on the selected object and user formation are sent to the ISO server 160 (T-commerce server of ISO) via the ISO 130. At this time, the user information may be current time, a channel, a click position in a picture, etc.

The ISO server 160 receives the information and identifies what broadcasting contents the picture selected by the user is through the CP server 161 (T-commerce server of Contents Provider) using the current time, the channel information or the like. In addition, the ISO server 160 identifies the object selected by the user using the particular position information selected by the user in the picture at particular time from the identified contents through the CM server 162 (T-commerce server of Contents Maker) and searches and extracts information related to the corresponding object (for example, detailed information, purchase-related information, information of the SM server 163 (T-commerce of Shopping mall), etc.).

The extracted information is sent from the ISO server 160 to the STB 100 via a public network 150 and the ISO 130 and the STB 100 provides the received information to the SDD 120 so that the user can easily confirm a variety of information related to the selected object through the SDD 120 in real time.

At this time, the function of the ISO server 160 may be processed by an application service processor 205 of the STB 100.

Hereinafter, a detailed structure of the STB 100 and the SDD 120 which perform the above-described various functions of the present invention will be described with reference to FIGS. 2 and 3.

Figure 2:
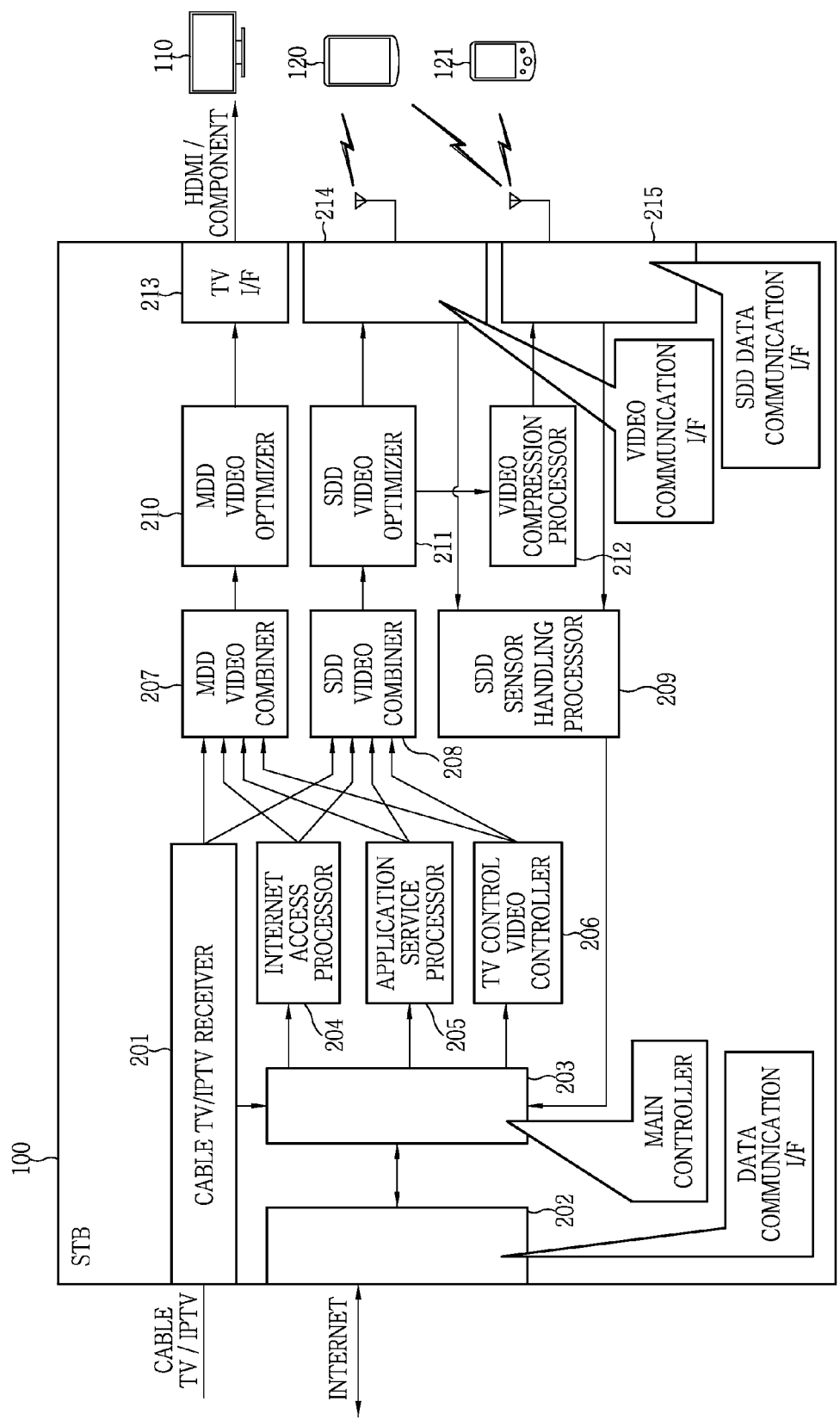
FIG. 2 is a block diagram showing a detailed structure of a set-top box (STB) according to an embodiment of the present invention.

FIG. 2 is a block diagram showing a detailed structure of a set-top box (STB) according to an embodiment of the present invention. Referring to FIG. 2, the STB 100 of this embodiment may include a cable TV/IPTV receiver 201, a data communication interface (I/F) 202, a main controller 203, an Internet access processor 204, an ISO/CP provided application service processor 205, a TV control video generator 206, an MDD video combiner 207, a SDD video combiner 208, a SDD sensor handling processor 209, an MDD video optimizer 210, a SDD video optimizer 211, a video compression processor 212, a TV I/F 213, a video communication I/F 214 and a SDD data communication I/F 215.

The cable TV/IPTV receiver 201 may be divided into a cable TV receiving unit and an IPTV receiving unit as broadcasting data receiving units. The cable TV receiving unit demodulates a cable TV signal. In this case, the demodulated signal data includes compressed video, voice and additional information. The compressed video is decompressed according to an MPEG/H.26x standard or the like to generate video raw data. In addition, the compressed voice is decompressed an MPEG/AC3/AAC standard or the like to generate audio raw data. In addition, the additional information is sent to the main controller 203. Meanwhile, a display picture including the video raw data is a pure TV display picture which is displayed on a TV display area of the MDD 110 or the SOD 120.

The IPTV receiving unit receives IPTV data including compressed video, voice and additional information via Internet. At this time, like the cable TV receiving unit, The compressed video is decompressed according to an MPEG/H.26x standard or the like to generate video raw data. In addition, the compressed voice is decompressed an MPEG/AC3/AAC standard or the like to generate audio raw data. In addition, the additional information is sent to the main controller 203. Meanwhile, a display picture including the video raw data is a pure TV display picture which is displayed on a TV display area of the MDD 110 or the SDD 120.

The data communication I/F 202 is a data communication channel which performs data communication, separately from reception of TV broadcasting contents from the cable TV/IPTV receiver 201. A communication means through the interface may be WiFi, 3G communication, or any Internet-accessible wired/wireless communication.

The main controller 203 performs a main control function of the STB 100 supporting various functions through the SDD 120 according to embodiments of the present invention. That is, the main controller 203 continues to update information on current TV broadcasting contents and provides the updated information to user through an Internet access. In addition, the main controller 203 receives a command desired by a user through the SDD sensor handling processor 209 and controls a display configuration of the MDD (i.e., TV) 110 and the SDD 120. In addition, the main controller 203 controls change of TV settings, such as TV channel change, voice adjustment and so on, and controls an Internet access through the SDD 120 and application services provided by the CP and the ISO, such as 'T-commerce.'

The Internet access processor 204 performs a function of controlling an Internet access by the user through the SDD 120. The Internet access processor 204 generates an Internet display area, separately from the TV display area, and provides a variety of information therethrough.

The application service processor 205 controls application services (for example, T-commerce, regional advertising, regional information, emergency information, etc.) provided by a CP (Content Provider) or an ISO (Internet Service Operator). That is, the application service processor 205 can provide application services, such as T-commerce service and so on, to users for items closely related to contents being currently broadcast. In addition, the application service processor 205 may perform a function of automatically displaying information closely related to the contents being currently broadcast in real time. For example, the application service processor 205 may provide SMS functions provided by the CP, including regional advertising, emergency information, etc. The information obtained through such various application services may configure one application service video area in the SDD 120.

The TV control video generator 206 generates a separate control display area for TV channel change, voice adjustment, setting change, etc. Such a control display area is generated based on a dynamic video according to an embodiment of the present invention, rather than an image provided by existing TVs.

The MDD video combiner 207 combines various display areas, which are provided through the above-described cable TV/IPTV receiver 201, Internet access processor 204, application service processor 205, and TV control video generator 206, into an MDD display area in a format set by a user. That is, the DMM display area may be divided into the TV display area, the Internet display area, the application display area, the control display area, etc., as described above.

In this case, as an example of the combination of the display areas, the MDD display area for TV output may be generated by scaling the four independent display areas variably according to user's preference or by overlapping the display areas together and processing a particular display area to be transparent or semitransparent.

The SDD video combiner 208 combines various display areas, which are provided through the above-described cable TV/IPTV receiver 201, Internet access processor 204, application service processor 205, and TV control video generator 206, into a SDD display area in a format set by a user. That is, the SMM display area may be divided into the TV display area, the Internet display area, the application display area, the control display area, etc., as described above.

In this case, as an example of the combination of the display areas, like the MDD video combiner 207, the SDD display area for SDD output may be generated by scaling the four independent display areas variably according to user's preference or by overlapping the display areas together and processing a particular display area to be transparent or semitransparent.

The MDD video optimizer 210 optimizes the MDD display area to be adapted for setting of a TV (i.e., MDD 110) used. In this case, various signal processing methods such as scaling, frame rate conversion, enhancement and so on may be applied for the optimization.

The SDD video optimizer 211 optimizes the SDD display area to be adapted for setting of the SDD 12 used. Also in this case, various signal processing methods such as scaling, frame rate conversion, enhancement and so on may be applied for the optimization. Accordingly, even when the dedicated SDD 120 under use is connected to the smart phone 121, an optimized video can be generated and provided to the smart phone 121.

The video compression processor 212 performs a video raw data compression function since it is inappropriate to send the video raw data if a smart phone or a tablet which employs no high speed transmission/reception technique such as Gigabit or the like is used. In this case, a processing configuration to decompress the compressed data at a device which received the compressed data has to be added.

The SDD sensor handling processor 209 performs a function of collecting information input through a touch screen or any input means by a user who uses the SDD 120 or a pseudo-SDD (for example, the smart phone 121). To this end, the SDD sensor handling processor 209 may employ an uplink channel of the video communication I/F 214 or an uplink channel of WiFi. As an alternate, the SDD sensor handling processor 209 may employ a communication means such as Bluetooth (BT) or the like.

Meanwhile, the information received in the SDD sensor handling processor 209 is sent to the main controller 203 to control the above-described display areas or execute an instruction desired by the user.

The TV I/F 213 is an interface connected to a TV (i.e., the MDD 110), which may employ various connection means such as HDMI/Component/Composite and so on.

The video communication I/F 214 is an interface for video raw data transmission, which may employ WirelessHD, WirelessUSB, WirelessPCI or WiGig for HD signal transmission. In this case, a downlink may be used for the video raw data transmission and an uplink may be used as a return channel for input information transmission by a user by means of a touch screen.

The SDD data communication I/F 215 may be implemented by WiFi so that a smart phone or a tablet can be used as a pseudo-SDD. If the pseudo-SDD is not used, the SDD data communication I/F 215 may be used for implementation of a simple return channel in the SDD.

Figure 3:
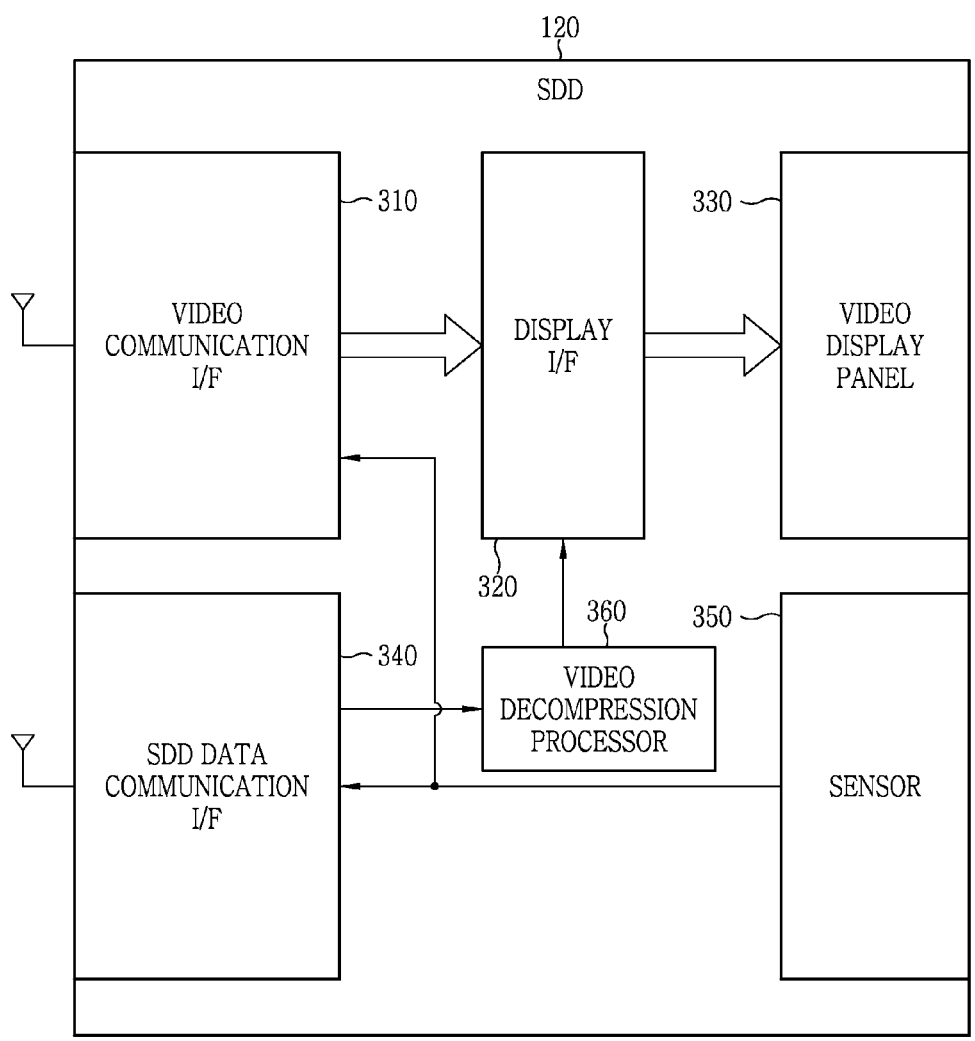
FIG. 3 is a block diagram showing a detailed structure of a slave display device (SDD) according to an embodiment of the present invention.

FIG. 3 is a block diagram showing a detailed structure of a slave display device (SDD) according to an embodiment of the present invention. Referring to FIG. 3, the SDD 120 according to this embodiment may include a video communication I/F 310, a display I/F 320, a video display panel 330, a SDD data communication I/F 340, a sensor unit 350 and a video decompression processor 360.

The video communication I/F 310 is an interface for reception of video raw data from the STB 100, which may employ WirelessHD, WirelessUSB, WirelessPCI or WiGig for HD video signal reception. In this case, as described above, a downlink may be used for the video raw data transmission and an uplink may be used as a return channel for input information transmission by a user by means of a touch screen.

The display I/F 320 is an interface for display of the received video raw data on the video display panel 330 (for example, an LCD panel) and may refer to an LCD driver or the like.

The sensor unit 350 may be implemented in various ways depending on the use of the SDD 120. Preferably, the sensor unit 350 is basically implemented by touch screen sensors. That is, the user sends a selection instruction of the SDD 120 to the STB 100 by touching a touch screen. Meanwhile, if the user uses the SDD 120 as a game machine or the like, a gravity sensor, an acceleration sensor, a direction sensor and so on may be added. In addition, a microphone may be added to deliver voice data to the STB 100. In this case, by adding a voice recognition function to the main controller 203, the MDD 100 can control channel change, voice adjustment and so on through a voice instruction.

The SDD data communication I/F 340 provides an interface for sending data of the sensor unit 350 to the STE 100. In this case, since the amount of information to be sent from the sensor unit 250 is not much, WiFi or Bluetooth (BT) may be employed. Meanwhile, the function of the SDD data communication I/F 340 may be substituted with the uplink of the video communication I/F 310.

The video decompression processor 360 decompresses the compressed video data received from the SDD data communication I/F 340 and delivers the decompressed video data to the display I/F 320. This can be optionally applied when the video communication I/F 310 is not used.

As shown, the SDD 120 of this embodiment can be manufactured as an inexpensive and light product since it does not require a separate MCU sub system (i.e., an MCU, a flash memory, a D-RAM and peripherals) and a separate GPU sub system (i.e., a GPU, a graphic D-RAM and peripherals) which are indispensable for typical smart phones, tablets and so on.

Figure 4:
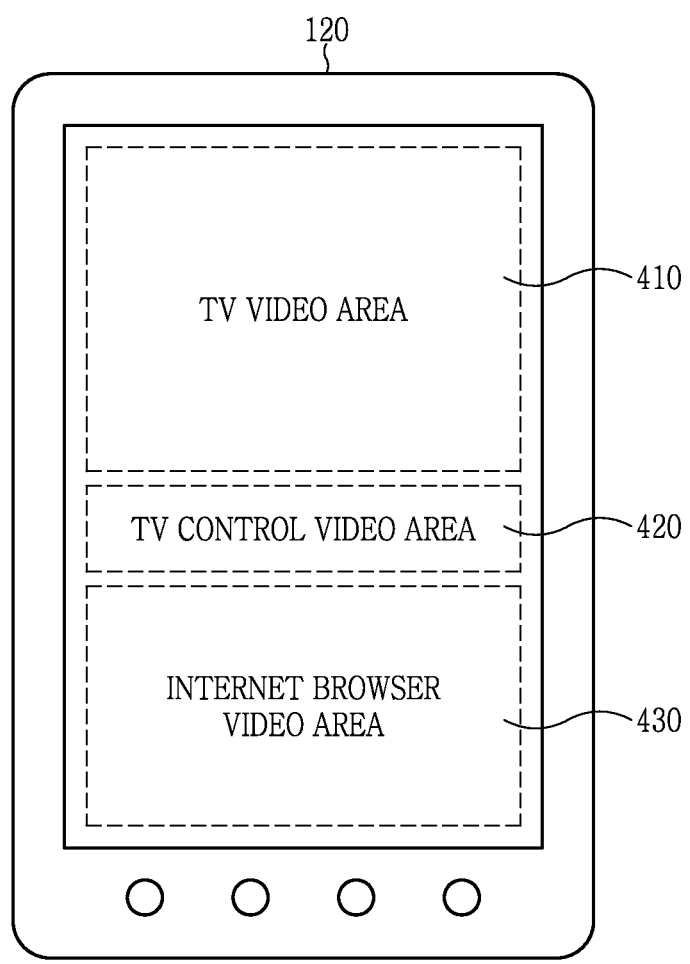
FIG. 4 is a view showing an example of a picture configuration of a slave display device according to an embodiment of the present invention.

FIG. 4 is a view showing an example of a picture configuration of a slave display device according to an embodiment of the present invention. Referring to FIG. 4, the SDD 120 of this embodiment may be divided into a TV video area 410, a TV control video area 420 and an Internet browser video area 430. In addition, although not shown in FIG. 4, an application service video area for providing application services (for example, T-commerce) may additionally provided.

The TV video area 410 can resize videos provided from a TV (i.e., the MDD 110) according to the present invention to be viewed with the same size or can display a broadcasting video different from the broadcasting video of the MDD 110 depending on a setting by a user.

The TV control video area 420 provides various control means in the form of a static or dynamic icon or button and videos of the MDD 110 or the SDD 120 can be controlled by clicking on this area 420. In addition, the Internet browser video area 430 shows an internet browser video provided via Internet connected through the STB 100 according to this embodiment.

FIG. 5 is a view showing a digital broadcasting control procedure through a slave display terminal according to an embodiment of the present invention. Referring to FIG. 5, when broadcasting information and broadcasting-related information are received in the STB 100 according to the present invention from an external server (for example, the terrestrial broadcasting server 140 or the cable broadcasting server 141) (S501 and S502), the STB 100 sends the received information to the MOD 110 and the SDD 120 (S503 and S504). The broadcasting information and broadcasting-related information are divided into the respective display areas in the picture of the SDD 120 as shown in FIG. 4.

At this time, when a video control instruction is selected or input through a touch screen or the like in the TV control video area of the SDD 120 (S505), a corresponding video control signal is delivered to the STB 100 which then controls the picture of the MDD 110 or the SDD 120 based on the received control signal. Thus, the STB 100 configures pictures changed based on the control signal and delivers it to the MDD 110 and the SDD 120 (S508 and S509), respectively.

Meanwhile, when an object of interest in a video being currently broadcast in the SDD 120 according to this embodiment is selected (S510), user information is sent to the external server (i.e., the ISO server 160) through the STB 100. At this time, the sent user information may include current time, broadcasting channel, selection position information, etc.

Then, the external server extracts information related to the selected object by referring to the received user information (S513) and then sends the extracted information to the SDD 120 through the STB 100 (S514 and S515). Then, the SDD 120 displays the received information on the application service area and so on (S516).

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A digital contents control system comprising:
a set-top box which generates a first video for a master display device and a second video for a slave display device with a received broadcasting signal and sends the generated videos to the master display device and the slave display device, respectively;
the master display device for receiving the first video generated for the master display device from the set-top box and displaying the received first video; and
the slave display device for receiving the second video generated for the slave display device from the set-top box, displaying the received second video and providing a control video area for control of the master display device or the slave display device to a separate display area, wherein, when a control instruction is input through the control video area provided in the slave display device, the input control instruction is sent to the set-top box and the set-top box controls the first or second video for the master display device or the slave display device according to the input control instruction, wherein the slave display device provides an Internet browser video area to the video area of the slave display device and is connected to Internet through the set-top box, wherein, when a particular object is selected from the broadcasting second video being displayed in the slave display device, the slave display device sends user information according to the selection to an application service processor of the set-top box, and the application service processor sends the user information to an external server and receives and processes information related to the selected object from the external server, wherein the user information includes current time information, broadcasting channel information, and position information selected by a user from a current broadcasting contents video, wherein the set-top box receives a control instruction related to a current broadcasting video from the slave display device, collects, classifies and processes information desired by a user through Internet according to the received control instruction, and provides the processed information to the master display device or the slave display device.

2. The digital contents control system according to claim 1, wherein the system collects information on a channel being currently viewing by a user through the set-top box from an external server, analyzes the collected information, and displays advertising, regional information and emergency information desired by the user on an application service video area of the slave display device.

3. The digital contents control system according to claim 1, wherein the set-top box receives a control instruction for at least one application service from the slave display device, collects application service-related information desired by a user through Internet according to the received control instruction, and provides the collected information to the master display device or the slave display device.

4. The digital contents control system according to claim 3, wherein the application service includes one selected from a group consisting of TV electronic commerce (T-commerce), e-learning, banking, game, advertising and health.

* * * * *